United States Patent [19]

Harbolt et al.

[11] Patent Number: 4,528,919
[45] Date of Patent: Jul. 16, 1985

[54] MULTI-PHASE FLUID FLOW DIVIDER

[75] Inventors: Bruce A. Harbolt, Northridge, Calif.; Rodney T. Sands, Klamath, Oreg.

[73] Assignee: Union Oil Company of California, Los Angeles, Calif.

[21] Appl. No.: 454,833

[22] Filed: Dec. 30, 1982

[51] Int. Cl.³ .............................................. A01C 23/02
[52] U.S. Cl. .................... 111/7; 137/561 A; 239/553.3
[58] Field of Search .......... 111/6, 7; 137/561, 561 A, 137/861; 239/553, 553.3; 222/4, 478

[56] References Cited

U.S. PATENT DOCUMENTS

| | | | |
|---|---|---|---|
| 2,110,430 | 3/1938 | Swanson | 137/861 |
| 2,158,716 | 5/1939 | Bergdoll | 137/861 |
| 2,193,696 | 3/1940 | Ramsaur | 137/861 |
| 2,532,918 | 12/1950 | Hungerford, Jr. | 137/78 |
| 2,650,556 | 9/1953 | Turner | 111/7 |
| 2,782,739 | 2/1957 | Freer | 111/7 |
| 3,139,848 | 7/1964 | Welty | 111/7 |
| 3,372,658 | 3/1968 | Ammann | 111/7 |
| 3,640,308 | 2/1972 | Bydal | 137/561 |
| 3,656,657 | 4/1972 | Smith et al. | 222/4 |
| 3,795,259 | 3/1974 | Brandin et al. | 137/561 |
| 4,140,178 | 2/1979 | Ohlswager et al. | 137/561 A |
| 4,214,609 | 7/1980 | Wiesboeck | 111/7 |
| 4,283,205 | 8/1981 | Schumann | 55/128 |
| 4,310,344 | 1/1982 | Kjelgaard et al. | 71/61 |

FOREIGN PATENT DOCUMENTS

| | | | |
|---|---|---|---|
| 692051 | 8/1964 | Canada | 137/561 A |
| 701082 | 1/1965 | Canada | 111/6 |
| 2043161 | 3/1972 | Fed. Rep. of Germany | 137/561 |
| 2420833 | 11/1975 | Fed. Rep. of Germany | 137/561 A |
| 1371048 | 7/1964 | France | 111/7 |

Primary Examiner—James R. Feyrer
Attorney, Agent, or Firm—Robert J. Baran; Gregory F. Wirzbicki; Dean Sanford

[57] ABSTRACT

The instant invention relates to an apparatus and method for dividing a flowing multi-phase fluid to provide at least two separate fluid streams wherein each fluid stream has substantially the same ratio of phases. This apparatus and method are especially useful for dividing a fluid having a gaseous and a liquid phase e.g. ammonia, to provide at least two separate fluid streams wherein each fluid stream has about the same weight ratio of liquid phase to gaseous phase. The apparatus includes a fluid inlet chamber in fluid communication with at least two separate fluid outlet chambers through a plurality of fluid conduits. Each of the fluid conduits has a fluid conduit inlet opening communicating with the fluid inlet chamber and a fluid outlet opening communicating with one of the fluid outlet chambers. The fluid conduit inlet openings are arrayed in a plurality of groups, wherein each group has at least two members, and the fluid conduits are adapted to provide that each fluid outlet chamber is in fluid communication with only one member of each group of fluid conduit inlet openings. This apparatus and method may be used for distributing equal amounts of ammonia as a mixture of ammonia vapor and ammonia liquid, to the soil. A system for distributing ammonia to the soil which includes the apparatus is also disclosed.

17 Claims, 4 Drawing Figures

MULTI-PHASE FLUID FLOW DIVIDER

BACKGROUND OF THE PRIOR ART

1. Field of the Invention

The instant invention relates to an apparatus and method useful for dividing fluids comprising more than one phase, e.g. a gaseous phase and a liquid phase, into separate fluid streams wherein the ratio of phases in said separate fluid streams are substantially equal. The apparatus and method are especially useful for uniformly distributing ammonia, as a fluid including both liquid ammonia and ammonia vapor, to the soil for the purpose of fertilizing the soil.

2. Background of the Art

The difficulty in separating fluid streams having more than one phase into separate fluid streams wherein each fluid stream has the same ratio of phases as each other fluid stream is well known. It is especially difficult to uniformly divide a multi-phase fluid flowing through a single conduit into a plurality of fluid streams when such fluid includes both a gaseous and a liquid phase. The gaseous phase is generally of lower density than the liquid phase and is more subject to change in volume as the pressure acting on the fluid stream varies. Therefore at any point at which the fluid stream is to be divided there will generally be a non-uniform variation of the liquid and the gaseous phase in the cross sectional plane of the fluid conduit.

The approach of workers who are concerned with the handling and separation of multi-phase fluid streams having both a gaseous and liquid phase is illustrated in U.S. Pat. Nos. 3,795,259 to Brandon et al.; and 4,140,178 to Sohlswager et al. In U.S. Pat. No. 4,140,178 the vapor phase and the liquid phase are separated, each phase is divided and then a portion of the liquid is combined with a portion of the vapor. Thus, the division of the multi-phase fluid stream is effected by separately dividing the liquid phase and the vapor phase.

In U.S. Pat. No. 3,795,259 a mixture of a gas and a liquid is also divided but there is no recombination after such division. This patent does not have the even division of the gas and the liquid between the divided streams as an objective of the invention.

Another device for the division of a two-phase fluid is found in U.S. Pat. No. 4,283,205 to Schuman. This patent illustrates the separation of fluid streams of particular matter fluidized in a gas. Like U.S. Pat. No. 3,795,259 there is no teaching of or necessity for recombining the fluid streams after such separation.

In other arts, the division of single phase fluid streams, in a manner to ensure that each such divided fluid stream has a uniform composition, is desirable. For example, in the art of making fibers by passing high molecular weight thermoplastic material through a spinnerette it is known that different fiber properties are obtained depending on where the material utilized in spinning the fibers originates. Thus, as a molten thermoplastic material is pushed through a spinnerette the composition will vary according to the location of the material from the walls of the spinnerette towards the center. In particular, the higher molecular weight (and more viscous) material will tend to orient at the inner walls of the spinnerette even at high flow rates. Many devices have been disclosed to minimize such variation. For example, see Canadian Pat. No. 692,051 which discloses a manifold apparatus and a process for dividing a fluid stream. This invention is directed toward the division of single phase, molten thermoplastic materials. The patentee separates the molten thermoplastic from the periphery of the internal conduit of the spinnerette for spinning fibers and passes the molten thermoplastic from the center of said fluid conduit to a subsequent spinnerette for spinning other fibers. The patentees objective is to obtain uniform fibers by providing a uniform residence time for the molten thermoplastic material in the spinnerette. The patentee however does not combine the separated fluid streams but instead directly spins a fiber from the fluid that is separated.

In U.S. Pat. No. 3,640,308 to Bydal, a molten thermoplastic material is separated into a plurality of streams and one group of streams is then combined. The separation is achieved by dividing the fluid stream into axisymmetric sectors and combining one group of alternate sectors into a single fluid stream. The patentees purpose is to assure a uniform concentration of additives in the resulting fibers. Note, however, that only one group of axisymmetric sectors is combined. The remaining group is directly spun into fibers. Moreover, the patentee does not contemplate the more difficult problem of equally dividing a fluid that is a mixture of a gaseous and liquid phase.

In particular none of the above references are concerned with the problems of evenly distributing ammonia to the soil for the purpose of fertilizing the soil. Ammonia a very cheap and efficient fertilizer, is provided to the fertilizer industry as a liquid under pressure. The difficulty with distributing ammonia to the soil results from the fact that it is necessary to reduce the pressurized ammonia to atmospheric pressure at the point at which it is introduced into the soil, i.e. at the individual shanks of a tiller. As ammonia is passed from a pressurized tank through various fluid conduits, i.e., the valves, T-connections and manifolds utilized in the art to divide the ammonia into separate streams for delivery to the individual shanks of the tiller, it is found that the ammonia stream at each shank is a varied mixture of liquid and vapor. In part such variation is inherent in the division of any flowing fluid having a liquid and a gaseous phase and in part this variation is a result of changes in the planar orientation of such valves, T-connections and manifolds as the tiller encounters resistance from the soil. At any point of division into separate fluid conduits, a fluid conduit that is displaced vertically from the horizontal plane to a greater degree will receive more of the less dense ammonia vapor than a fluid conduit that is not displaced vertically from the horizontal plane. Since the vapor comprises a much greater volume than the liquid a fluid stream comprising more ammonia vapor than liquid will have correspondingly less fertilizer value. Thus it will be seen that various portions of the crop will be more luxuriant than other positions indicating an unequal distribution of ammonia. Unfortunately, it is difficult to prevent such changes of planar orientation in a tilling operation.

Thus it is an object of the instant invention to provide a system for distributing equal amounts of ammonia as a fertilizer to tilled soil.

It is another object of the instant invention to provide an apparatus useful for dividing flowing multi-phase fluid streams into streams wherein the ratio of each phase is equal.

It is another object of the instant invention to provide an apparatus useful for dividing a flowing fluid stream comprising a liquid and a gas into streams wherein the ratio of said liquid and said gas is equal.

It is another object of the instant invention to provide an apparatus useful for dividing a flowing fluid stream comprising a liquid and a gas into streams wherein the ratio of said liquid and said gas is substantially equal in all of the streams and wherein said ratio is independent of changes in planar orientation of said apparatus.

Other objects and advantages of the instant invention will become apparent from the following description taken in connection with the accompanying drawings, wherein are set forth by way of illustration and example, certain embodiments of this invention.

SUMMARY OF THE INVENTION

The instant invention relates to an apparatus and method for dividing a flowing multi-phase fluid to provide at least two separate fluid streams wherein each fluid stream has substantially the same ratio of phases. The novel apparatus includes a fluid inlet in fluid communication with at least two separate fluid outlets and each fluid outlet is in fluid communication with such fluid inlet through a plurality of fluid conduits. Each of the fluid conduits has a separate fluid conduit inlet opening within the fluid inlet. The fluid conduit inlet openings are arrayed in a plurality of groups, and each group will have at least two members. The fluid conduits are adapted to provide that each fluid outlet is in fluid communication with only one member of each group of fluid conduit inlet openings.

This novel apparatus is especially useful for dividing a fluid having a gaseous and a liquid phase to provide at least two separate fluid streams wherein each fluid stream comprises about the same weight ratio of said liquid phase and said gaseous phase.

In a most preferred embodiment of the instant invention the above apparatus may be incorporated into a system for distributing equal amounts of ammonia to the soil. In such system, the novel apparatus of the instant invention is interposed between, and is in fluid communication with, a pressurized ammonia holding tank and the individual shank tubes of one or more tool bars adapted for tilling the soil. The instant novel apparatus functions to equally divide the ammonia stream, including both liquid ammonia and ammonia vapor, and provide substantially equal amounts of ammonia, as a fertilizer, to the individual shanks as the shanks are pulled through the soil.

BRIEF DESCRIPTION OF THE DRAWINGS

The instant invention may be clearly understood by reference to the drawings wherein like numerals refer to like elements, and in which FIGS. 1 through 3 show one preferred embodiment of the novel apparatus of the instant invention useful for separating a flowing multi-phase fluid into two separate fluid streams having about the same ratio of phases, wherein:

FIG. 1 is a partially cutaway elevation view showing the arrangement of the fluid conduits within a housing of one embodiment of the instant apparatus.

FIG. 2 is a cross-sectional view of the fluid inlet chamber of the embodiment illustrated in FIG. 1 taken along line 2—2 of FIG. 1 and showing a preferred arrangement of the fluid conduit inlet openings within said fluid inlet chamber;

FIG. 3 is a cross-sectional view of the fluid outlet chambers of the embodiment of FIG. 1 taken along line 3—3 of FIG. 1 and showing the fluid conduits terminating in separate fluid outlet chambers.

DETAILED DESCRIPTION OF THE INVENTION

Figures 1, 2, 3:
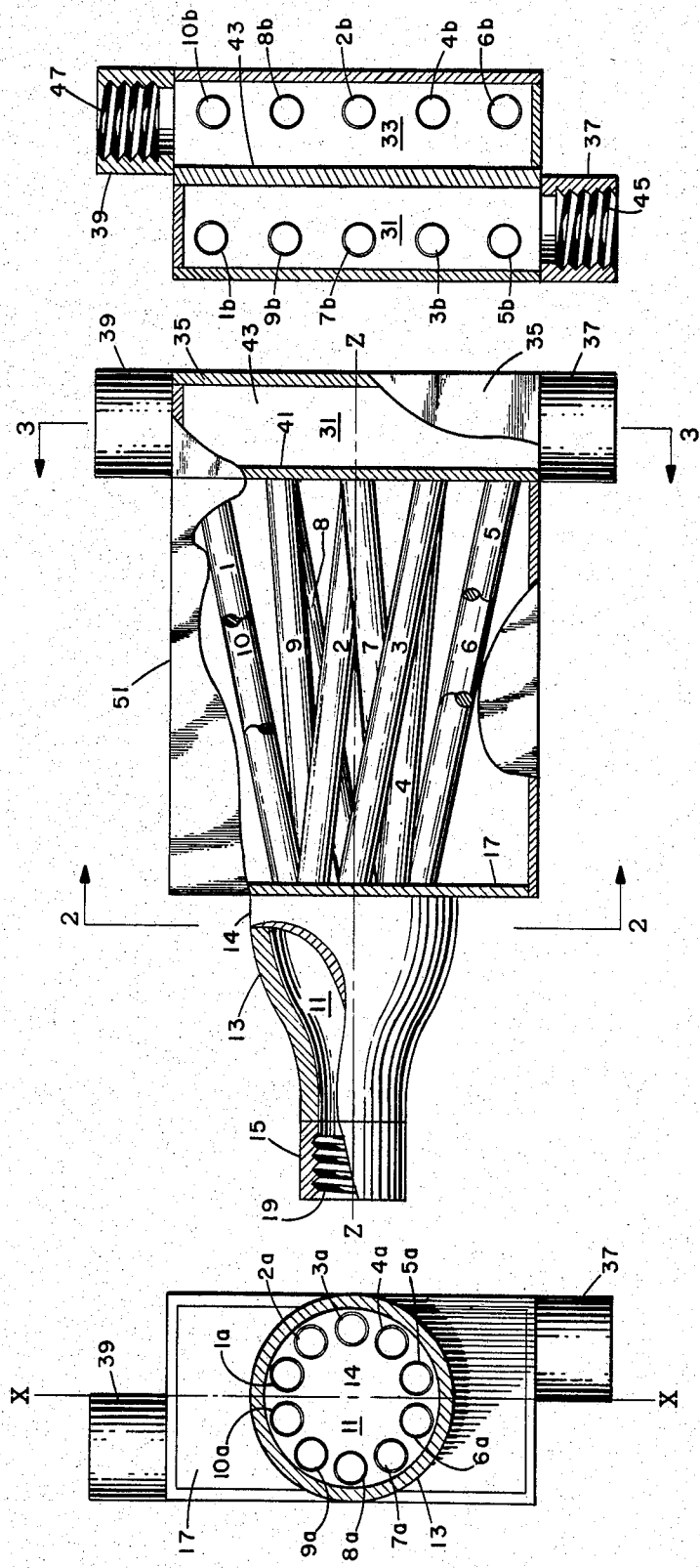

Referring to FIG. 1, housing 13 defines an inlet chamber 11 which expands in circular cross-sectional area from fluid inlet section 15 of housing 13 to the outlet section 14 of housing 13. Inlet section 15 may have threaded connection 19 or after coupling means to couple housing 13 to a source of fluids. Housing 13 is fluid tightly connected to apertured plate 17 and, through the apertures 1a through 10a in plate 17, conduits 1 through 10 respectively are adapted to receive fluid discharged from chamber 11 and to discharge fluid through apertures 1b through 10b in apertured plate 41. Housing 35 is fluid tightly connected to plate 41 and contains internal partition 43 which divides the interior of housing 35 into chambers 31 and 33 (as best seen in FIG. 3) which are fluid tightly sealed one from the other. Housing 35 has two separate outlet sections, outlet section 37 adapted to allow the discharge of fluids from chamber 31 and outlet section 39 adapted to allow the discharge of fluids from chamber 33. Outlet sections 37 and 39 may have threaded connections 45 and 47, respectively, or other coupling devices to allow the coupling of discharge conduits or the like to housing 35. As shown, outlet sections 37 and 39 are preferably located as to discharge fluids in opposite directions.

The apertures of plates 17 and 41 define the fluid conduit inlet openings and the fluid conduit outlet openings, respectively, of the fluid conduits. Thus apertures 1a through 10a define the fluid conduit inlet openings and apertures 1b through 10b define the fluid conduit outlet openings of conduits 1 through 10, respectively.

The fluid conduit inlet openings are arrayed in plate 17 (as shown) in five groups of two members each. Thus fluid conduit inlet openings 1a and 10a, 9a, and 8a, 7a and 6a, 5a and 4a and 3a and 2a, each define a group of fluid conduit inlet openings. The overall array of inlet openings 1a through 10a define a circular configuration. This circular configuration provides a uniform distribution of fluid conduit inlet openings and has been found to be a suitable arrangement for dividing a flowing fluid of circular cross-section. The fluid conduit outlet openings in plate 41 are arrayed to be divided into two groups of five members, each group being in separate communication with one of fluid outlet chambers 31 and 33. Each member of the above described groups of two fluid conduit inlet openings, is connected through a fluid conduit with a fluid conduit outlet opening that is in fluid communication with a different fluid outlet chamber than the other member of such group. Thus inlet chamber 11 communicates with outlet chamber 31 through fluid conduits 1, 3, 5, 7 and 9 and outlet chamber 33 through fluid conduits 2, 4, 6, 8 and 10. Preferably the two nearest neighbors of each particular fluid conduit communicate with a different outlet chambers than the fluid conduit in question. For example fluid conduits 10 and 2, the neighbors of conduit 1, both communicate with fluid outlet chamber 33 through fluid conduit outlet openings 10b and 2b respectively.

As shown in FIG. 1, the fluid conduits may be enclosed by a third housing 51 affixed to apertured plates 17 and 41 to provide mechanical strength to the instant novel apparatus.

If it is desired to divide the multi-phase fluid into three or more separate fluid streams, the second housing may be partitioned internally to provide three or more fluid outlet chambers. Of course the fluid conduit inlet openings will necessarily be arrayed in groups of three or more members, correspondingly, and each fluid outlet chamber will be in fluid communication with only one member of such group. Adapting the apparatus of FIGS. 1 through 3 to divide a flowing multi-phase fluid into three or more fluid streams having a substantially equal ratio of phases is within the skill of the art and need not be described further herein.

For most efficient division of a flowing multiphase fluid, the fluid conduit inlet openings are preferably oriented in the plane perpendicular to the direction of flow of the multi-phase fluid through the novel apparatus. Moreover, the area of the individual fluid conduit inlet openings is preferably substantially smaller than the cross-sectional area of the flowing multi-phase fluid and the total area of the fluid conduit inlet openings is more approximately equivalent to such cross-sectional area. (Generally, at the usual rate of flow of the multi-phase fluid through the fluid flow divider of this invention, the cross-sectional area of the flowing multiphase fluid is approximately equivalent to the area of the first apertured plate that is enclosed by the first housing. For the purpose of this invention, where the cross-sectional area of the flowing multiphase fluid is referred to, it is referred to the area of the first apertured plate that is enclosed by the first housing). For example, the ratio of the total area of the fluid conduit inlet openings to the cross-sectional area of the flowing multiphase fluid may be from about 0.3 to about 0.9, e.g., about 0.5. It is also desirable that fluid conduit inlet openings are uniformly distributed throughout the enclosed area of the first perforated plate.

Finally, as shown in FIG. 2, it is preferred that the distance between the individual members of each group of fluid conduit inlet openings is substantially less than the average distance between an individual group and the other groups. For example, as shown in FIG. 2 the distance between fluid conduit inlets 2a and 3a, is much less than the average of distances between said group, and the groups of fluid conduit inlet openings 10a and 1a, 9a and 8a, 7a and 6a, and 5a and 4a, respectively. Most preferably, each member of a group of fluid conduit inlet openings is of similar area and spaced equidistant from each other member.

In the novel apparatus of FIGS. 1 through 3, there are only two members in each group, and therefore each fluid conduit inlet opening is necessarily spaced equidistant from each other fluid conduit inlet opening making up such group. It will be apparent that when each group includes three members the individual fluid conduit inlet openings may be arrayed to define the corners of a triangle and when each group includes four members the individual fluid conduit inlet openings may be arrayed to define the corners of a square for equidistant spacing between fluid conduit inlet openings.

In the method for using the instant novel apparatus, the multiphase fluid is flowed through fluid inlet chamber 11 into contact with apertured plate 17 wherein such multiphase fluid is divided in the plane per pendicular to the direction of the flow into 10 separate streamlets in order to flow through fluid conduits 1 through 10. Preferably, at each point where the multi-phase fluid contacts apertured plate 17 a substantially uniform division of phases is obtained by providing that the area of each individual fluid conduit inlet opening is substantially smaller than the cross-sectional area of the flowing multiphase fluid, while the total area of the fluid conduit inlet openings is approximately equal to such cross-sectional area. It will be apparent that as the individual area of each fluid conduit inlet opening is decreased and the number of fluid conduits is increased, a more uniform division of the phases in the flowing fluid is obtained. The fluid conduit inlet openings are grouped to provide that each member of the group communicates with a different fluid outlet chamber than the other members of that group. Thus, the arrangement, and the area of the fluid conduit inlet openings and the number of fluid conduits may be easily varied to provide for a desired degree of uniform division of the multi-phase fluid.

Figure 4:
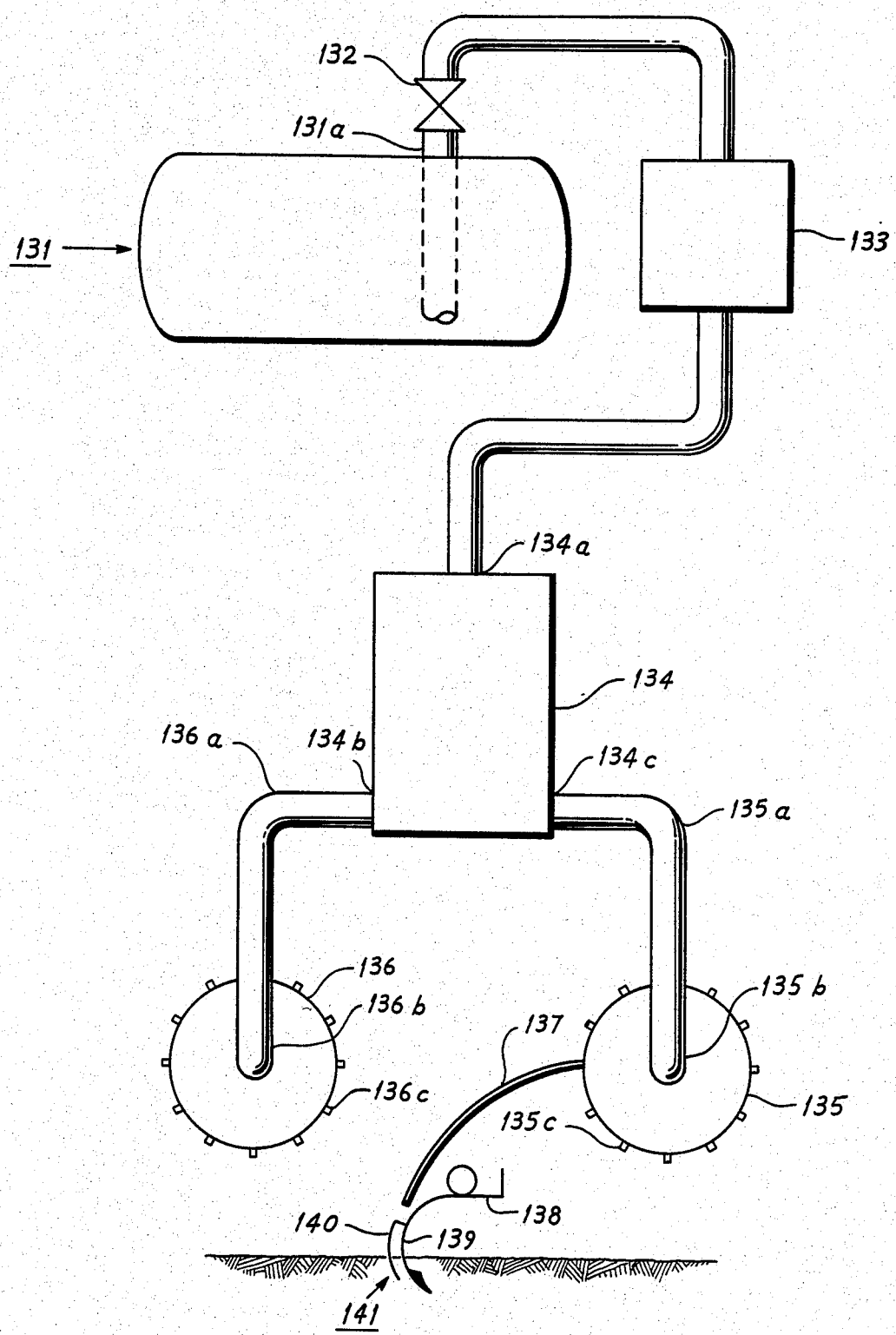
FIG. 4 is a schematic diagram illustrating a system for distributing ammonia to the soil which incorporates the novel fluid flow divider of the instant invention.

FIG. 4 illustrates a novel system for distributing equal amounts of ammonia to the soil which system may incorporate the novel apparatus of FIGS. 1 and 3. An ammonia holding tank 131 adapted to contain ammonia at an elevated pressure and having an outlet 131a is utilized to hold the ammonia for distribution to the soil. A fluid flow measuring device 133 is in fluid communication with said outlet 131a through a valve 132 which is adapted to regulate the flow of ammonia from said ammonia holding tank. The novel apparatus for dividing a flowing fluid having both ammonia vapor and ammonia liquid 134 (for example as shown in FIGS. 1 through 3) is in fluid communication with said fluid measuring device. Such apparatus includes a fluid inlet 134a in fluid communication with at least two separate fluid outlets 134b and 134c. Each fluid outlet is in fluid communication with such fluid inlet through a plurality of fluid conduits (not shown). Each of said fluid conduits has a separate fluid conduit inlet opening, (not shown) within such fluid inlet. The fluid conduit inlet openings are arrayed in a plurality of groups, wherein each of such groups has two members. The fluid conduits are adapted to provide that each fluid outlet is in fluid communication with only one member of such group.

As shown, the novel apparatus 134 is in fluid communication with two manifolds 135 and 136 through manifold supply lines 135a and 136a respectively. However more than two manifolds may be utilized by providing groups of fluid conduit inlet openings having three or more members and a corresponding number of fluid outlets as discussed above. Each manifold is in fluid communication with a separate fluid outlet. Each manifold includes a manifold inlet 135b and 136b and a plurality of manifold outlets as illustrated by 135c and 136c. The manifold outlets are adapted for coupling to a shank hose 137.

The above system also includes one or more tool bars 138. It will be appropriate that both manifolds may be coupled to separate tool bars or only one. Such tool bar will have a plurality of shanks 139 which are adapted to till the soil when the tool bar is pulled therethrough as for example by a tractor (not shown). Each shank has a shank tube 140 attached thereto and adapted to distribute ammonia into soil through ammonia exit orifice 141. Each ammonia exit orifice is in fluid communication with a separate manifold outlet by means of a separate shank hose. It is important to provide equal pressure drop at each ammonia exit orifice to insure uniform delivery of ammonia to the soil. An equal pressure drop can be insured by providing that the manifold supply lines 136a and 136b are each of equal length and inner diameter and that all the shank hoses are also of equal length and inner diameter. Moreover, each manifold should have an equal number of shank outlets and all should be in use or the same number taken out of use on each.

The invention is further illustrated by the following example which is illustrative of a specific mode of practicing the invention and is not intended as limiting the scope of the appended claims.

EXAMPLE

To test the ability of the novel apparatus of the instant invention to divide a multi-phase fluid a mixture of water and air is passed through an apparatus of this invention which is substantially as illustrated in FIGS. 1 through 3. The quantity of water exiting from outlets 37 and 39 is measured and the difference is determined. The exiting air is not measured. Air is passed into such apparatus at 30 p.s.i.g. and combined with the water just before fluid inlet 15. The fluid outlets 37 and 39 are coupled through a hose to calibrated containers. The flow divider is tested at four orientations and five tests were run at each orientation. The percent accuracy values given in Table 1 below are an average of the 5 tests for each orientation.

Note that despite changes in planar orientation of the instant apparatus the ratio of phases of the multi-phase fluid in each exiting fluid is approximately equal.

TABLE 1

| Test Number | Position[a] | Accuracy[b] |
|---|---|---|
| 1 | z horizontal<br>x horizontal | 5% |
| 2 | z horizontal<br>x tilted 20° from horizontal | 8% |
| 3 | z vertical<br>inlet up | 2% |
| 4 | z tilted 15° clockwise<br>from vertical, outlet up | 3% |

[a]x and z are the lines shown in FIGS. 1 and 2 which are used to describe the orientation of the fluid flow divider during testing.
[b]Accuracy is calculated as the difference of the rate of flow from the two fluid outlets divided by the average rate of flow from the two outlets times 100.

While particular embodiments of the invention have been described, it will be understood, of course, that the invention is not limited thereto since many obvious modifications can be made, and it is intended to include within this invention any such modification as will fall within the scope of the appended claims.

Having now described the invention, we claim:

1. A method for dividing a flowing multiphase fluid to provide a plurality of separate fluid streams, wherein each fluid stream comprises substantially the same ratio of phases, said method comprising (a) passing said multi-phase fluid through a plurality of fluid conduits each of said fluid conduits having an inlet opening and an outlet opening, said inlet openings being arrayed in a plurality of groups, each of said groups having at least two members, to provide a plurality of individual steamlets originating at said inlet openings; and (b) combining, at said outlet openings, one streamlet from each group of inlet openings to provide a plurality of separate fluid streams having substantially the same ratio of phases.

2. The method of claim 1 wherein said multiphase fluid comprises a mixture of ammonia liquid and ammonia vapor.

3. An apparatus for dividing a flowing fluid having more than one phase to provide at least two separate fluid streams such that each fluid stream comprises about the same ratio of each of the phases, which apparatus comprises fluid inlet means in fluid communication with at least two separate fluid outlet means through a plurality of fluid conduits, each of said fluid conduits having a fluid conduit inlet opening adapted to receive fluid from said fluid inlet means and a fluid conduit outlet opening adapted to discharge fluid into one of said fluid outlet means, said fluid conduit inlet openings being arrayed in a plurality of groups, each of said groups having at least two members and said fluid conduits being adapted to provide that each fluid outlet means is in fluid communication with only one member of each group of fluid conduit inlet openings.

4. An apparatus for dividing a flowing multiphase fluid to provide at least two separate fluid streams, wherein each fluid stream comprises substantially the same ratio of said phases, said apparatus comprising a housing having fluid inlet means and at least two non-communicating fluid outlet means, each of said fluid outlet means having a fluid outlet chamber and an outlet opening, each of said fluid outlet chambers being in fluid communication with said fluid inlet means through a plurality of fluid conduits, each of said fluid conduits having an inlet opening adapted to receive fluids from said fluid inlet means and having outlet openings adapted to discharge fluid into one of said fluid outlet means, and said inlet openings being arrayed in a plurality of groups, each of said groups having at least two members and each member being substantially equidistant from each other member of said group and in fluid communication with a different fluid outlet chamber than each other member of said group.

5. An apparatus for dividing a flowing multiphase fluid to provide at least two separate fluid streams wherein each fluid stream contains about the same weight ratio of phases which apparatus comprises:
   (a) a first housing affixed to a first apertured plate to enclose the apertures and define a fluid inlet chamber, the apertures of said first apertured plate defining fluid conduit inlet openings, said fluid conduit inlet openings being arrayed in a plurality of groups, each of said groups having at least two members and each member being substantially equidistant from each other member, said first housing having fluid inlet-coupling means opposite said first apertured plate, said fluid inlet-coupling means being in fluid communication with said fluid inlet chamber and adapted to be coupled to a fluid delivery hose,
   (b) a plurality of fluid conduits each including one of said fluid conduit inlet openings adapted to receive fluid from said fluid inlet chamber; and
   (c) a second housing affixed to a second apertured plate, the apertures of said second apertured plate defining fluid conduit outlet openings, each in separate fluid communication with a single fluid conduit inlet opening, said second housing enclosing said fluid conduit outlet openings and being internally partitioned and secured to said second apertured plate to define at least two separate fluid outlet chambers, each of said fluid outlet chambers being in fluid communication with, and adapted to receive fluid from, only one member of each group of fluid conduit inlet openings, and said second housing having at least two fluid outlet-coupling means, each in fluid communication with a separate fluid outlet chamber and adapted to be coupled to a fluid delivery hose.

6. The apparatus of claim 5 wherein said fluid conduits are enclosed by a third housing affixed to said first and second apertured plates.

7. The apparatus of claim 6 wherein the two nearest neighbors of each fluid conduit inlet opening are in fluid communication with a different fluid outlet chamber than said fluid conduit inlet opening.

8. The apparatus of claim 6 wherein said first housing is adapted such that said inlet chamber expands in cross-sectional area from said fluid inlet-coupling means toward said first apertured plate.

9. The apparatus of claim 8 wherein the cross-sectional area of each inlet opening is substantially less than the area of said first apertured plate that is enclosed by said first housing.

10. The apparatus of claim 9 wherein the cross-sectional area of the inlet openings occupies substantially all of the enclosed area of the first apertured plate.

11. The apparatus of claim 9 wherein the ratio of the total area of the fluid conduit inlet openings to the enclosed area of the first apertured plate is from 0.3 to about 0.9.

12. The apparatus of claim 9 wherein said fluid conduit inlet openings are uniformly distributed throughout the enclosed area of said first apertured plate.

13. The apparatus of claim 9 wherein the distance between the individual members of each group of inlet openings is less than the average distance between an individual group of inlet openings and the other groups of inlet openings.

14. The apparatus of claim 9 wherein each member of a group of inlet openings is of equal cross-sectional area.

15. The apparatus of claim 9 wherein said fluid conduit inlet openings are arrayed in a circular configuration.

16. The apparatus of claim 15 consisting of two fluid outlet chambers.

17. A system for distributing equal amounts of ammonia to the soil which comprises:
(a) an ammonia holding tank adapted to contain ammonia at an elevated pressure and having tank outlet means,
(b) fluid flow regulating means in fluid communication with said tank outlet means and adapted to regulate the flow of ammonia from said ammonia holding tank,
(c) fluid flow dividing means in fluid communication with said fluid flow regulating means, said fluid flow dividing means comprising a fluid inlet in fluid communication with at least two separate fluid outlets through a plurality of fluid conduits each of said fluid conduits having a separate fluid conduit inlet opening adapted to receive fluid from said fluid dividing inlet and a fluid conduit outlet opening adapted to discharge fluid into one of said fluid dividing outlets, said fluid conduit inlet openings being arrayed in a plurality of groups, each of said groups having at least two members and said fluid conduits being adapted to provide that each of said fluid outlet openings is in fluid communication with only one member of each group of said fluid conduit inlet openings,
(d) at least two manifold means, each having a manifold inlet and a plurality of manifold outlets, each such manifold means being in fluid communication with a separate one of said fluid outlets,
(e) at least one tool bar, each tool bar having a plurality of shanks, and a shank tube affixed to each shank, each of said shank tubes having an ammonia exit orifice, and being adapted to distribute ammonia into the soil as said shank tills the soil; and,
(f) shank hoses, each of which provides fluid communication between a single manifold outlet and an individual shank tube, said shank hoses being dimensioned to provide an equal pressure drop between said manifold and said ammonia exit orifices.

* * * * *